US006322840B2

(12) United States Patent
Panattoni et al.

(10) Patent No.: US 6,322,840 B2
(45) Date of Patent: Nov. 27, 2001

(54) PASTA PRODUCT AND MANUFACTURE THEREOF

(75) Inventors: Lorenzo Panattoni, Winterthur; Robert Gerald Odermatt, Frauenfeld; Jonas Peter Halden, Seuzach, all of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/725,960

(22) Filed: Nov. 30, 2000

Related U.S. Application Data

(63) Continuation-in-part of application No. 09/525,001, filed on Mar. 14, 2000, now abandoned.

(30) Foreign Application Priority Data

Mar. 14, 2000 (EP) ................................................. 99200802

(51) Int. Cl.⁷ ....................................................... A23L 1/16
(52) U.S. Cl. ......................... 426/557; 426/451; 426/496; 426/512
(58) Field of Search ................................... 426/557, 451, 426/512, 496

(56) References Cited

U.S. PATENT DOCUMENTS

| 4,076,846 | 2/1978 | Nakatsuka et al. | 426/62 |
|---|---|---|---|
| 4,886,440 | 12/1989 | Forrest et al. | 425/208 |
| 5,279,658 | 1/1994 | Aung | 106/154.1 |
| 5,462,758 * | 10/1995 | Ventres et al. | 426/557 |
| 5,482,725 | 1/1996 | Cavicchiolo | 426/143 |
| 5,728,418 * | 3/1998 | Hauser et al. | 426/557 |
| 5,759,608 * | 6/1998 | Momiyama | 426/557 |
| 5,935,628 * | 8/1999 | Hauser et al. | 426/557 |
| 6,030,651 * | 2/2000 | Bronner | 426/557 |

FOREIGN PATENT DOCUMENTS

| 42 30 040 | 4/1993 | (DE) . |
|---|---|---|
| WO 93/25089 | 12/1993 | (WO) . |
| WO 95/31907 | 5/1994 | (WO) . |

OTHER PUBLICATIONS

Patent Abstracts of Japan, vol. 016, No. 128 (C–0924), Apr. 2, 1992, JP 03 292868, Dec. 24, 1991.

* cited by examiner

*Primary Examiner*—Lien Tran
(74) *Attorney, Agent, or Firm*—Winston & Strawn

(57) ABSTRACT

A process for manufacturing a tridimensional pasta product by preparing a mixture of cereal flour or semolina and water; kneading the mixture to obtain a dough; injecting the dough into a mold having a tri-dimensional shape under conditions such that the dough undergoes substantially no expansion in the mold during injection; and removing the dough from the mold to provide an injection molded pasta product having the tri-dimensional shape. These molded tridimensional pasta products possess organoleptic properties which are superior to those of traditional pasta products.

14 Claims, No Drawings

PASTA PRODUCT AND MANUFACTURE THEREOF

CROSS-REFERENCE TO RELATED APPLICATIONS

This application is a continuation-in-part of application Ser. No. 09/525,001, filed Mar. 14, 2000.

TECHNICAL FIELD

The present invention relates to a pasta product and to a process for the manufacture of a pasta product.

BACKGROUND ART

Numerous pasta products exist on the market today. Although tridimensional pasta products are desirable, such products are typically achieved at the expense of their organoleptic properties. For example, U.S. Pat. No. 4,076,846 discloses an edible molding composition mainly comprising a starch, sodium caseinate, glycerol, and an emulsifier which may be used for manufacturing biodegradable packaging films or containers by extrusion or injection molding.

Also, U.S. Pat. No. 4,886,440 discloses an injection molding apparatus and process for the manufacture of food or pet food products having tri-dimensional shapes, such as a bone shape for dogs or a fish shape for cats, from a mixture of meat meal and wheat flour.

Thus, there is a need for improvements in tridimensional pasta products that have good organoleptical properties which may be compared with those of traditional pasta products, and the present invention satisfies this need.

SUMMARY OF THE INVENTION

The present invention relates to a process for manufacturing a tridimensional pasta product. The process for manufacturing a tridimensional pasta product includes the steps of preparing a mixture of cereal flour or semolina and water; kneading the mixture to obtain a dough; injecting the dough into a mold having a tri-dimensional shape, wherein the dough undergoes substantially no expansion in the mold during injection, and removing the dough from the mold to provide an injection molded pasta product having the tri-dimensional shape.

The mixture may have a water content of from about 10% to 35%, preferably of from about 22 to 26%, and more preferably of from about 24 to 25%. The cereal may be Durum or hard wheat, rice, corn, or mixtures thereof. The process my further include adding one or more of wheat protein, soft wheat flour, egg material, sodium chloride, spices, and mixtures thereof to the mixture.

The injecting may involve using a screw enclosed in a jacketed barrel, the screw being rotatable and longitudinally translatable in the barrel and the barrel having a downstream end in the form of a nozzle. The mold may be in two parts engageable with one another and held together by a clamping means.

The dough to be injected may be heated to a temperature of from about 30° C. to 150° C., preferably of from about 60° C. to 95°0 C., and more preferably of from about 80° C. to 85° C., the injection means being therefore heatable and the temperature controllable. The dough may be injected into the mold under a pressure of at least about 200 bar. In one embodiment the dough is injected into the mold under a pressure of between about 1000 and 3000 bar.

During molding, the dough may be heated to a temperature of from about 30° C. to 150° C., preferably of from about 50° C. to 80° C., and more preferably of from about 55° C. to 65° C., the molding means being therefore heatable and the temperature controllable. The process may further include the steps of drying the injection molded pasta product to a residual water content of from about 4% to 13.5% and cooling the molded pasta product.

The present invention also relates to an injection molded tridimensional pasta product prepared according to the process of the invention. The tridimensional pasta product may include one or more additives such as wheat protein, soft wheat flour, egg material, sodium chloride, spices, and mixtures thereof. The cereal flour may be Durum or hard wheat, rice, corn, or mixtures thereof. The pasta product may have a water content of from about 4% to 32%. The pasta product may have a gelatinization degree of greater than about 69 percent.

DETAILED DESCRIPTION OF THE PREFERRED EMBODIMENTS

The present invention provides a tridimensional pasta product having organoleptical properties which are better compared with those of traditional pasta products.

The invention also provides a process for manufacturing such tridimensional pasta products. Preferably, the pasta product is an injection molded pasta product.

The process for manufacturing a pasta product according to the present invention comprises preparing a mixture of cereal flour or semolina and water, kneading the mixture to obtain a dough, and injection molding the dough. The dough is injected so that it undergoes substantially no expansion during the injecting.

The pasta product may be made from a raw material mixture that includes a cereal flour or semolina. The cereal may be, for example, Durum or hard wheat, rice, and/or corn. The mixture may have a water content of from about 10% to 35%, preferably of from about 22 to 26%, and more preferably of from about 24 to 25%. The pasta product may have a gelatinization degree of from 0 to 100%. The pasta product may have a water content of from 4 to 32%.

The process may further comprise adding to the mixture one or more of wheat protein, soft wheat flour, egg material, sodium chloride; and the like. Wheat protein, especially gliadin enriched wheat protein, such as the product marketed under the name Lavor Pro, manufactured by Midwest Grain Products, Inc. of Atchison, Kans. USA, may be used in an amount of from about 1 to 3% by weight of the mixture, in order to reduce the stickiness and improve the firmness of the cooked pasta. Soft wheat flour may be added to the mixture in order to increase the elasticity of the pasta product. Egg material in the form of whole egg powder, egg white powder, or liquid whole egg may be added to the mixture in order to increase the firmness of the pasta product.

The steps of preparing the mixture and kneading the mixture to obtain a dough may be carried out with traditional bread or pasta making equipment such as, for example, a baker's mixer and kneader, paddle mixer, mono- or twin-screw kneader, or in the barrel of equipment traditionally used for the injection molding of plastics.

The injection molding is carried out in a manner such that expansion of the dough mixture is substantially avoided, i.e., that the final product has undergone no apparent expansion and is essentially the same volume as that of the original injected dough. Expansion of the dough mixture is avoided by injecting the dough mixture directly into the mold under pressure. A pressure of at least about 200 bar and preferably at least about 400 bar is typically used.

The step of injection molding may be carried out with any equipment comprising adequate injection means and molding means. Adequate injection means may comprise, for example, a piston and a nozzle; an extruder and a nozzle; a gear pump and a nozzle; or the barrel, screw, and nozzle of equipment traditionally used for the injection molding of plastics.

Adequate molding means may comprise a mold in two parts engageable with one another and leaving a space between them corresponding to the shape of the product to be manufactured, the space being connected to a conduit or dough inlet, and the two parts being held together by clamping means.

Preferably, the present invention is carried out with equipment traditionally used for the injection molding of plastics, in which the injection means comprises a screw enclosed in a jacketed barrel, the screw being rotatable and longitudinally translatable in the barrel, the barrel having a downstream end in form of a nozzle; and in which the molding means comprises a mold in two parts, engageable with one another, and held together by clamping means.

The dough to be injected may be heated to a temperature of from about 30° C. to 150° C., preferably of from about 60° C. to 95° C., and more preferably of from about 80° C. to 85° C., the injection means being therefore heatable and the temperature controllable. The dough is advantageously injected into the mold under a pressure in the range of between about 1000 and 3000 bar as this prevents expansion of the dough mixture in the mold. The final extruded and molded product shape has essentially the same volume as the amount of dough material that is injected into the mold.

During molding, the dough may be heated to a temperature of from about 30° C. to 150° C., preferably of from about 50° C. to 80° C., and more preferably of from about 55° C. to 65° C., the molding means being therefore heatable and the temperature controllable.

The injection molded pasta product, as released by opening the mold, may have a water content of from about 8 to 32%, for example. The molded pasta product may then be dried to a residual water content of from 4 to 13.5%, for example, surprisingly, it was possible, according to the present method, to manufacture pasta products having attractive tri-dimensional shapes, such as half hollow spheres or ellipsoids, which could not be manufactured in the traditional way, namely by extruding raw dough through die openings, but which nevertheless have good organoleptic properties which are comparable to those of traditional pasta products.

The pasta product and the process according to the present invention are illustrated in the following Examples in which the percentages are by weight.

EXAMPLES

Example 1

An Injection Molded Pasta Product According to the Invention

A pasta product having a tri-dimensional shape was manufactured using a 22M type injection molding apparatus manufactured by the BOY AG company of Neustad, Germany. A mixture of water and Durum wheat containing 200 ppm cysteine was prepared with a paddle mixer. The mixture had a water content of 21%. The mixture was introduced into the barrel of the injection molding apparatus where it was kneaded to obtain a dough and the dough was heated to a temperature of 100° C. The dough was then injected into a screw shaped mold under a pressure of 1400 bar. The temperature of the mold was held at 400° C.

The resulting pasta product had a well defined screw shape, a water content of 18.5%, a gelatinization degree of 72%, and organoleptic properties comparable with those of regular pasta such as Durum wheat macaroni, for example.

Examples 2 to 5

Injection Molded Pasta Products According to the Invention

Pasta products having a tri-dimensional were manufactured with the aid of a 270M type injection molding apparatus manufactured by the ARBURG AG company of Lossburg, Germany. Several different mixtures of water and Durum wheat containing 200 ppm cysteine were prepared with a paddle mixer. The mixtures had water contents of 16% or 21%. The mixtures were introduced into the barrel of the injection molding apparatus where they were kneaded to obtain a dough. The doughs were heated to temperatures of 60, 80, or 90° C. and were injected into a plug shaped mold under pressures of 1400, 1800, or 2500 bar. The temperature of the mold was held at either 30 or 40° C. The resulting pasta products had well defined plug shapes and gelatinization degrees, and water contents as indicated in Table 1. The pasta products had organoleptic properties comparable with those of regular pasta, such as Durum wheat lasagne sheets.

TABLE 1

| Example No | | 1 | 2 | 3 | 4 | 5 |
|---|---|---|---|---|---|---|
| Dough water content | (%) | 21 | 21 | 21 | 21 | 16 |
| Mold shape | | screw | plug | plug | plug | plug |
| Barrel temperature | (° C.) | 100 | 80 | 60 | 60 | 90 |
| Injection pressure | bar | 1400 | 1400 | 1800 | 2500 | 2500 |
| Mold temperature | (° C.) | 40 | 30 | 30 | 40 | 40 |
| Pasta water content | (%) | 18.5 | 19.7 | 19.8 | 17.8 | 14.5 |
| Pasta gelatinization degree | (%) | 72 | 69 | 69 | 84 | 100 |

Example 6

An Injection Molded Pasta product According to the Invention

A pasta product having a lasagne sheet shape was manufactured with the aid of a 27CM type injection molding apparatus manufactured by the ARBURG AG company of Lossburg Germany. A mixture of water and Durum wheat containing 200 ppm cysteine was prepared with a paddle mixer. The mixture had a water content of 27%. The mixture was introduced into the barrel of the injection molding apparatus where it was kneaded to obtain a dough and the dough was heated to a temperature of 65–70° C. The dough was injected into a lasagne sheet shaped mold under a pressure of 1500 bar. The temperature of the mold was held at 35° C. The resulting pasta product had a well defined lasagne sheet shape, a water content of 24%, a gelatinization degree of between 0 and 20%, and organoleptic properties comparable with those of regular lasagne Durum wheat pasta sheets.

Example 7

An Injection Molded Pasta product According to the Invention

A pasta product having a car or a boat shape was manufactured with the aid of a 320S-500-150 type injection molding equipment manufactured by the company ARBURG AG in Lossburg (Germany).

In a paddle mixer, a mixture of water and Durum wheat semolina added with 200 ppm cystein was prepared which had a water content of 24%.

The mixture was introduced into the barrel of the injection molding equipment where it was kneaded to obtain a dough and the dough was heated up to a temperature of 85° C. The dough was injected into three car and three boat shaped molds under a pressure of 1400–1600 bar. The temperature of the molds was held at 65° C.

The pasta product thus obtained had well defined car or boat shapes. Each car or boat had a weight of from about 4.0 to 4.2 g.

The cars and boats were cooked in salted water. After a cooking time of 10 minutes the cars and boats had organoleptic properties comparable with those of regular Durum wheat "al dente" cooked pasta products.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A process for manufacturing a tridimensional pasta product comprising the steps of:
    preparing a mixture of cereal flour or semolina and water;
    kneading the mixture to obtain a dough;
    injecting the dough into a mold having a tri-dimensional shape, under conditions such that the dough undergoes substantially no expansion in the mold during injection wherein the dough is heated during the injecting to a temperature of from about 30 degree C to 150 degree C and the dough is injected into the mold under a pressure of at least about 200 bar; and
    removing the dough from the mold to provide an injection molded pasta product having the tri-dimensional shape.

2. The process of claim 1, wherein the mixture has a water content of from about 10% to 35%.

3. The process of claim 2, wherein the mixture has a water content of from about 22% to 26%.

4. The process of claim 2, wherein the mixture has a water content of from about 24% to 25%.

5. The process of claim 1, wherein the cereal is selected from the group consisting of Durum or hard wheat, rice, corn, and mixtures thereof.

6. The process of claim 1, which further comprises adding to the mixture at least one additive selected from the group consisting of wheat protein, soft wheat flour, egg material, sodium chloride, spices, and mixtures thereof.

7. The process of claim 1, wherein the injecting comprises using a screw enclosed in a jacketed barrel, the screw being rotatable and longitudinally translatable in the barrel and the barrel having a downstream end in the form of a nozzle; and the mold comprises two parts engageable with one another and held together by a clamping means.

8. The process of claim 1, wherein the dough is heated during the injecting to a temperature of from about 60° C. to 95° C.

9. The process of claim 1, wherein the dough is during the injected to a temperture of from about 80° C. to 85° C.

10. The process of claim 11, wherein the dough is injected into the mold under a pressure of between about 1000 and 3000 bar.

11. The process of claim 1, wherein the dough is heated in the mold to a temperature of from about 30° C. to 150° C. before removing the dough.

12. The process of claim 11, wherein the dough is heated in the mold to a temperature of from about 50° C. to 80° C. before removing the dough.

13. The process of claim 11, wherein the dough is heated in the mold to a temperature of from about 55° C. to 65° C. before removing the dough.

14. The process of claim 11, further comprising the steps of drying the injection molded pasta product to a residual water content of from about 4% to 13.5% and cooling the molded pasta product.

\* \* \* \* \*

UNITED STATES PATENT AND TRADEMARK OFFICE
CERTIFICATE OF CORRECTION

PATENT NO.     : 6,322,840 B2
DATED          : November 27, 2001
INVENTOR(S)    : Panattoni et al.

It is certified that error appears in the above-identified patent and that said Letters Patent is hereby corrected as shown below:

Title page,
Item [30], Foreign Application Priority Data, change "Mar. 14, 2000" to
-- Mar. 16, 1999 --.

Column 6,
Line 30, after "dough is", insert -- heated --;
Line 31, change "injected" to -- injecting --;
Line 32, change "11" to -- 1 --.

Signed and Sealed this

Ninth Day of July, 2002

Attest:

JAMES E. ROGAN
Attesting Officer   Director of the United States Patent and Trademark Office